US006818707B2

(12) United States Patent
Walisser

(10) Patent No.: US 6,818,707 B2
(45) Date of Patent: Nov. 16, 2004

(54) SPRAY DRIED PHENOLIC RESOLE MOLDING POWDER WITH CRYSTALLINE PHENOLIC COMPOUNDS

(75) Inventor: Wayne R. Walisser, Floyds Knobs, IN (US)

(73) Assignee: Borden Chemical, Inc., Columbus, OH (US)

( * ) Notice: Subject to any disclaimer, the term of this patent is extended or adjusted under 35 U.S.C. 154(b) by 396 days.

(21) Appl. No.: 10/041,913

(22) Filed: Jan. 8, 2002

(65) Prior Publication Data

US 2003/0130395 A1 Jul. 10, 2003

(51) Int. Cl.[7] .............................................. C08L 61/10
(52) U.S. Cl. ..................... 525/485; 523/145; 524/594
(58) Field of Search ........................ 525/485; 523/145; 524/594

(56) References Cited

U.S. PATENT DOCUMENTS

| | | | |
|---|---|---|---|
| 4,098,770 A | 7/1978 | Berchem et al. | 528/130 |
| 4,116,921 A | 9/1978 | Olivo et al. | 260/38 |
| 4,157,993 A | 6/1979 | Funabiki et al. | 260/28 |
| 4,182,696 A | 1/1980 | Wynstra et al. | 260/17.2 |
| 4,182,732 A | 1/1980 | Fry | 525/482 |
| 4,206,095 A | 6/1980 | Wynstra et al. | 260/17.2 |
| 4,317,901 A | 3/1982 | Cosway | 528/139 |
| 4,414,378 A | 11/1983 | Koyama et al. | 528/137 |
| 4,419,477 A | 12/1983 | Saeki et al. | 524/290 |
| 4,424,300 A | 1/1984 | Udvardy et al. | 525/501 |
| 4,426,484 A | 1/1984 | Saeki et al. | 524/541 |
| 4,542,204 A | 9/1985 | Shibahara et al. | 528/140 |
| 4,626,569 A | 12/1986 | Waitkus et al. | 524/541 |
| 4,708,967 A | 11/1987 | Ferentchak et al. | 521/56 |
| 4,950,433 A | 8/1990 | Chiu | 264/13 |
| 5,002,994 A | 3/1991 | Lord et al. | 524/425 |
| 5,019,618 A | 5/1991 | Chiu | 524/405 |
| 5,047,275 A | 9/1991 | Chiu | 428/106 |
| 5,571,854 A | 11/1996 | Ishida et al. | 524/324 |
| 5,639,806 A | 6/1997 | Johnson et al. | 523/208 |
| 5,691,409 A | 11/1997 | Ishida et al. | 524/509 |

Primary Examiner—Tae H. Yoon
(74) Attorney, Agent, or Firm—Cantor Colburn LLP

(57) ABSTRACT

A binder composition comprising a blend of a crystalline phenolic compound having two or more hydroxyphenyl groups and a thermosetting spray dried phenolic resole resin is disclosed. The binder together with a filler is particularly useful in the preparation of molding compounds.

23 Claims, No Drawings

SPRAY DRIED PHENOLIC RESOLE MOLDING POWDER WITH CRYSTALLINE PHENOLIC COMPOUNDS

FIELD OF THE INVENTION

This invention relates to a low cost binder composition comprising a blend of a thermosetting spray dried phenolic resole resin and a phenolic crystalline compound having two or more hydroxyphenyl groups. The binder, among other uses, finds utility in the preparation of molding compounds.

BACKGROUND OF THE INVENTION

Commercially, the phenolic powder molding industry is dominated by novolac powders. Thermosetting phenolic novolac molding powders are prepared in 5 distinct steps:

(1). Reacting phenol with aqueous formaldehyde under strongly acidic conditions.
(2). Distilling the reaction mixture to remove excess phenol and water.
(3). Flaking the hot phenolic novolac melt on a cold flaker belt into a handleable solid.
(4). Grinding the resulting solid thermoplastic novolac flake into a powder.
(5). Blending the novolac powder with powdered hexamethylenetetramine (hexa) to make it thermoset.

Thermosetting, mainly compression molded articles, are then produced by compounding the novolac-hexa powders into a wide variety of fillers, e.g., friction compounds like barytes for automotive brake pads, abrasive compounds like alumina for grinding wheels, refractory aggregates like magnesia and graphite for refractory bricks, glass fibers and fillers for automotive engine intake manifolds, inert fillers like calcium carbonate for lamp cement pastes, and in many other matrixes for articles that require good modulus retention at elevated temperatures. Also, the excellent adhesive properties of novolac molding powders make them useful for compounding with glass and textile fibers for automotive acoustical insulation, wood fiber for automotive interior door panels, textile fibers for automotive interior package trays, and wood flour for toilet seat moldings, etc.

Novolac powders are particularly suitable for making thermoset molding compounds as they: are free flowing and easily blended with other fibrous, granular or powdered components, including hexa; are resistant to sintering; have excellent hot flow characteristics since the powder melts with good fluidity at mold temperature, and flows, to wet out the matrix and fill voids before it thermosets; can be molded with short cycles; have excellent heat resistance and dimensional stability; have a very low flame smoke rating; and are low in cost.

Novolac molding powders, however, do suffer from one significant problem, mainly, the liberation of odiferous hexa decomposition products, such as trimethylamine and ammonia, during the high temperature molding process. High odor is particularly objectionable in articles molded for automotive interior components.

It is an object of this invention to provide novel thermosetting adhesive compositions.

It is another object of the present invention to provide a novel molding powder that retains some or all of the advantages described above for the novolac-hexa powders while producing molded articles that do not contain objectionable odors.

These objects are achieved by using a blend of a spray dried resole resin with a phenolic crystalline compound having two or more hydroxyphenyl groups.

DESCRIPTION OF THE PRIOR ART

Phenolic resole resins are prepared with an excess of formaldehyde and are therefore thermosetting and, unlike thermoplastic novolacs which are prepared with an excess of phenol, do not require compounding with hexamethylenetetramine (hexa, a formaldehyde source) to become thermosetting. The thermosetting, temperature sensitive nature of phenolic resoles, however, makes them much more difficult to prepare in solid form versus phenolic novolacs. Converting the resole to solid form requires significant heat input to remove the large amounts of water added from the aqueous formaldehyde used to make the resole. Too much temperature exposure may advance the resole to a state that renders it useless as a molding powder.

The fundamentally simpler and less expensive nature of phenolic resoles, often described as "one step" or "one stage" resins versus the "two step" or "two stage" (compounding with hexamine) novolacs, however, has fostered the description, in the prior art, of many different minimal heat input drying techniques for the preparation of solid phenolic resole resin molding powders, including:

(1). U.S. Pat. No. 5,047,275 of September 1991; U.S. Pat. No. 4,950,433 of August 1990 and U.S. Pat. No. 5,019,618 of May, 1981, all by S. Chiu which describe improving spray dryability of a low advanced phenol-formaldehyde resin by inclusion of a water soluble boron oxo compound.
(2). U.S. Pat. No. 4,708,967 of November 1987 by Ferentchak, et al. describes a centrifugal atomizer having a porous sintered metal filter ring, producing hollow resin particles.
(3). U.S. Pat. No. 4,626,569 of December 1986 by Waitkus, et al. example XXa, describes the solid pan cooling method, where substantially all of the water is removed by distillation and the hot, approx. 90 E C., molten thermosetting composition is discharged very quickly from the reaction vessel into thin layers in cooling pans where it cools rapidly forming a grindable solid, while retaining enough hot flow character to function as a molding powder.
(4). U.S. Pat. No. 4,542,204 of September 1985 by Shibahara, et al. describes dispersing the hot condensate in cold water with mechanical dewatering.
(5). U.S. Pat. No. 4,424,300 of January 1984 by O. Udvary, et al. describes spray drying by the spinning disc atomization process.
(6). U.S. Pat. No. 4,419,477 of December 1983 by Saeki, et al. in preparation example 2 describes a solid resole resin prepared by dehydration with distillation and rapid solid pan cooling.
(7). U.S. Pat. No. 4,414,378 of November 1983 by Koyama, et al. describes a reaction in dilute aqueous solution where a solid, reactive and fusible resole resin particle forms directly from a phenol formaldehyde reaction catalyzed with hydrochloric acid.
(8). U.S. Pat. No. 4,317,901 of March 1982 by H. Cosway, describes additions of polyvalent cationic precipitants with mechanical dewatering.
(9). U.S. Pat. No. 4,206,095 of July 1980 by J. Wynstra, et al. describes an aqueous suspension of a particulate resole with mechanical dewatering.
(10). U.S. Pat. No. 4,182,696 of January 1980 by Wynstra, et al. describes a precipitation and mechanical dewatering process.

(11). U.S. Pat. No. 4,098,770 of July 1978 by Berchem et al. describes a spray drying process.

Of the above methods only the spray drying techniques, such as described by Berchem, et al., Udvardy, et al., Ferentchak, et al., and S. Chiu, set forth hereinabove, all of which are incorporated herein by reference in their entirety, have reasonable economics and have gained significant commercial importance such as for use as adhesives in wood composite boards.

Thermosetting spray dried resoles, however, while having enough flow to function well as adhesives, do not have sufficient hot flow to function as molding powders, also referred herein simply as binders. Additionally, the spray dried resoles cause sticking in the molding equipment which, among other shortcomings, interferes with the flow of the molten binder. Resoles formulated to have better flow characteristics, such as those prepared by the method of Waitkus, may form sticky agglomerated masses in the hot air conveyance equipment and may sinter after cooling to a solid mass over a short period of time in their storable container due to inadequate moisture removal. The solid pan cooling method described by Waitkus while having the capability to produce material with acceptable hot flow has poor economics, as batch sizes must be kept small due to the requirement for very rapid discharge of the hot, molten thermosetting resole from the reaction vessel.

Several inventors have reported on improving the hot flow properties of solid phenolic resoles prepared via the solid pan cooling method by admixing the solid resole with phenolic novolac resins, including:

(1). U.S. Pat. No. 4,426,484 of January 1984 by Saeki, et al. which describes mixing a solid resole with a resorcinol novolac solid resin to improve cure properties in a pulverizer, kneader or mixer.
(2). U.S. Pat. No. 4,419,477 of December 1983 by Saeki, et al. which describes a mixture of a solid resole with solid novolac with addition of an aromatic carboxylic acid to improve cure properties.
(3). U.S. Pat. No. 4,157,993 of June 1979 by Funabiki, et al. which describes addition of a lubricant to a higher F:P (formaldehyde to phenol) mole ratio solid resole to inhibit "blocking" (sintering) prior to mixing with the solid novolac.

U.S. Pat. No. 4,626,569, which is listed above describes adding a furfuraldehyde novolac to the dispersed resole prior to dewatering. U.S. Pat. No. 4,424,300 listed above, combines a liquid novolac with a liquid resole prior to spray drying.

Very little prior art exists on improving the hot flow properties of spray dried resoles by modification before spray drying as virtually anything that might be done to improve hot flow interferes with spray drying. The Chiu patents such as U.S. Pat. No. 5,047,275 listed above, produce a lower molecular weight resole, that would have better hot flow, if not for the boron oxo compound added to maintain spray dryability.

Additionally very little prior art exists on improving the hot flow properties of spray dried resoles by admixing other modifiers in the resoles prior to being spray dried.

The use of crystalline phenolic compounds such as bisphenol-A alone are not suitable as molding powders since they have a thin, watery flow and do not cure. However, crystalline phenolic compounds have been reacted with formaldehyde to make resins which allegedly can be used in the molding, coating or adhesive arts. U.S. Pat. No. 4,116,921 of September 1978 to Olivo, et al. reacts formaldehyde with bisphenol-A to prepare a resole resin which can be used for making molded articles. Both U.S. Pat. No. 5,571,854 of November 1996 and U.S. Pat. No. 5,691,409 of November 1997 to Isheda et al. use crystalline phenolic compounds as part of a molding composition which is cured with hexa. U.S. Pat. No. 4,182,732 of January 1980 to J. Fry discloses a coating and adhesive composition of a phenolic resole resin that may be in powdered form which is prepared from bisphenol-A and formaldehyde. U.S. Pat. No. 5,369,806 of June 1997 to C. Johnson, et al. discloses compositions comprising bisphenol-aldehyde novolac resins, or a bisphenol homopolymer novolac used for coating propants. The composition may also include a phenolic resole resin.

SUMMARY OF THE INVENTION

In a general aspect this invention relates to thermosetting adhesives.

In one aspect, this invention relates to a binder composition comprising a blend of a thermosetting spray dried phenolic resole resin and a crystalline phenolic compound having two or more hydroxyphenyl groups.

In another aspect, this invention relates to a thermoset product prepared from a blend of a spray dried phenolic resole resin and a crystalline phenolic compound having two or more hydroxyphenyl groups.

In still another aspect, this invention relates to a molding compound comprising a filler and a blend of a crystalline phenolic compound having two or more hydroxyphenyl groups and a thermosetting spray dried phenolic resole resin.

In still a further aspect, this invention relates to a molded article comprising a filler bound under heat and pressure with a thermoset binder of a crystalline phenolic compound having two or more hydroxyphenyl groups and a thermosetting spray dried phenolic resole resin.

In another further aspect, this invention relates to a method for making a molded article by subjecting a mixture of a filler and a blend of a thermosetting spray dried phenolic resole resin with a crystalline phenolic compound having two or more hydroxyphenyl groups to heat and pressure in order to cure the binder.

In another aspect, this invention relates to a method for increasing the flow of a thermosetting spray dried phenolic resole resin by blending such resin with a crystalline phenolic compound having two or more hydroxyphenyl groups.

Advantages of this invention for use in molding include the following: (a) absence of odiferous hexamethylenetetramine (hexa) decomposition product during high temperature molding processes; (B) faster molding times and fast cure rates; (C) higher modulus; and (D) decreased incidence of blister formation, particularly for high temperature-short mold cycle times. Additionally, the advantages include: the preparation of a binder composition economically by simply blending the spray dry resole with the crystalline phenolic; a water absorption of the novel thermoset binder which is much the same as that produced by commercial molding powders, e.g., a 1:1 binder of spray dried resole resin and a crystalline phenolic compound used in this invention had a water absorption of 2.78% whereas a commercial molding powder used for high temperature molding applications, namely, SD 571 B of Borden Chemical, Inc. of Columbus, Ohio had a water absorption of 2.71%. SD 571 B is a commercial molding powder containing 89.5% of phenol-formaldehyde novolac resin and 10.5% of hexamethylenetetramine which is sold by Borden Chemical, Inc of Columbus; and obtaining of dynamic temperature ramp properties of viscosity changes over time for the binders at molding temperatures, e.g., 135° C., which are very similar to conventional novolac-hexa binders used for molding, e.g., such as the above mentioned SD 571 commercial molding powder. The binder compositions of this invention cure fairy completely as determined by acetone extractables.

DETAILED DESCRIPTION OF THE INVENTION

It has now been found that a blend of a thermosetting spray dried phenolic resole resin and a crystalline phenolic compound having two or more hydroxyphenyl groups provides an economical high performance binder for use in molding compounds that can be produced with a simple blending operation. This is believed to be unexpected since the resole has a very short flow and thus, does not work well as a molding powder. On the other hand, crystalline phenolic compounds such as bisphenol-A have a sharp melting point and provide a very thin melt when they flow. In this invention, the crystalline phenolic component appears to form a homogeneous melt with the resole to increase the melt flow of the resole and acts as a reactive diluent for the resole. The blend of the two cooperate to provide a free flowing melt. On curing, there is a good reaction between the two ingredients and the formation of a hard thermoset resin by reaction of the resole with the crystalline compound. Thus, this invention provides for a novolac and/or hexa free binder, particularly a novolac and hexa free molding compound.

The Thermosetting Spray Dried Phenolic Resole Resin

Although there are other methods for making powdered, curable phenolic resole resins, spray dried phenolic resole resins are dewatered by spraying the aqueous liquid resin. Such liquid resins which are subsequently spray dried to form the spray dried resole are typically prepared by reacting about 1.5 to 3.5 moles, preferably 2 to 3 moles, of an aldehyde such as formaldehyde with a phenol in the presence of an alkaline catalyst such as sodium hydroxide. The phenol may be entirely or partly substituted with other phenols, e.g., such as xylenols, cresols, and alkyl phenols such as those having from 1 to 3 carbon atoms in the alkyl group. When the phenol in the resole itself is partially substituted by another phenol, it is preferred that the substituent be only from about 1 to 20% of the total phenol content. Any of the spray-dried phenolic resole resins are suitable for use in this invention. Typically the spray dried resins have a particle size wherein 80% to 90% of the powdered resin has a particle size of less than about 100 microns and more typically less than about 75 microns. A preferred spray dried phenolic resole resin is that of the above mentioned S. Chiu et al. US patents such as U.S. Pat. No. 5,047,275 which are incorporated herein by reference in their entirety.

As shown in the above spray dried phenolic resole patent references, the resole powder can be in the form of hollow microspherical particles and it can contain additional ingredients such as oxo compounds of boron, as well as non-phenolic polyhydroxy compounds. Since the crystalline phenolic compound will require formaldehyde or methylene groups to cure, the amount of methylol groups from the spray dried resole resin should be sufficient to cure both the crystalline phenolic compound and the spray dry resin.

The Crystalline Phenolic Compound Having Two or More Hydroxyphenyl Groups

The crystalline phenolic compound having two or more hydroxyphenyl groups, is a phenolic compound having two or more hydroxyphenyl groups in the molecule which is crystalline at room temperature, has a definite melting point, becomes a liquid of low viscosity, e.g., lower viscosity than that of an ordinary phenolic resin when melted and can be cured when reacted with a formaldehyde or methylene donor such as a resole or hexa.

Illustrative of crystalline phenolic compounds having two or more hydroxyphenyl groups there can be mentioned: bisphenolic compounds such as bisphenol-A, bisphenol-C, bisphenol-E, bisphenol-F, bisphenol-AD, bisphenol Z, bisphenol-S, and their derivatives, biphenol and its derivatives, and phenolic compounds having three or four hydroxyphenyl groups such as those mentioned in U.S. Pat. No. 5,571,854 of November 1996. These phenolic compounds may be used singly or as a mixture of two or more of them.

The Binder Compositions

In making the binder blend of spray dried phenolic resole resin and the phenolic crystalline compound, the ingredients are intimately mixed so that they can compliment each other in providing a suitable flowable binder. Preferably both the crystalline compound and the resin are in powdered form, e.g., the crystalline phenolic compound will typically be micronized. The powdered ingredients are blended together. However blends of the two ingredients can be part of a granule or pellet such as wherein the blend of powders are compressed into pellets. The blend of the resole and crystalline materials are also referred to herein as binder compositions or molding powders.

The quantity of the resole resin and crystalline phenolic compound in the blend of resole and crystalline phenolic can vary over a broad range. For use of the binder composition as a molding compound, the spray dried resole resin is used in a quantity of from about 45% to 90%, by weight, preferably about 55% to 85% and particularly about 60% to 80% in the blend of the resole and phenolic compound. The quantity of crystalline phenolic compound in the blend with the spray dried resole can vary from about 10% to 55%, by weight, preferably 15% to 45% and particularly 20% to 40%. Quantities of the crystalline phenolic compound below about 10% do not provide sufficient length of flow whereas quantities of the crystalline phenolic compound in amounts of greater than about 55% produce a binder with too much flow and also with the need for longer curing times. As with the resole, the crystalline phenolic compound need not be in pure form as long as the requisite amount of crystalline phenolic compound such as bisphenol-A is present. Thus, tar bottoms from the manufacture of bisphenol-A can be used to supply bisphenol-A provided that the requisite amount of crystalline phenolic compound in relation to the resole is present.

The use of the crystalline phenolic compound in the binders of this invention provides a plasticizing and flow-enhancing effect to the resole resin which allows the resultant viscous mass of heated binder, with or without fillers and additives, to flow uniformly and sufficiently to completely fill the mold before a high degree of gelation and crosslinking of the binder occurs. This contrasts with the initially faster curing rates of the resole resin which has a short distance of flow, creates initial portions of gelled or crosslinked polymer molecules thereby also forming local stressed areas in the molded part, even if the viscous mass reaches all parts of the mold.

The binder compositions of this invention give a rheological graph with respect to time and temperature which resemble conventional novolac-hexa molding compounds.

The Molding Compounds

The compositions prepared by mixing the spray dried resole-crystalline phenolic binders of this invention with one or more fillers and optionally one or more additives are referred to herein as molding compounds.

The quantity of binder in the molding compound will typically vary from about 8% to 90%, by weight, and preferably from about 15% to 60% and particularly from about 20% to 40% by weight of the molding compound. The quantity of filler and any additives in the molding compound can vary from about 10% to about 92%, by weight, preferably from about 40% to 85% and particularly from about 60% to 80%. The quantity of additives will typically vary from about zero or two percent to about 10%, by weight of the molding compound.

The fillers and any additives used in the molding compounds can be the same as those used in conventional novolac-hexa molding compounds. Illustrative of additives there can be mentioned: stabilizers, lubricants, colorants, flame retarders, pigments, magnesium oxide, graphite, calcium carbonate, carbon black, nigrosine, fluoropolymers and salicylic acid. Illustrative of fillers there can be mentioned: wood flour, saw dust, nutshell flour, cellulose fibers, mica, wollastonite, miner wool, mineral flour, glass fibers, iron fibers, organic fibers such as aramid fibers, carbon fibers, clay and talc. When glass fibers are used as a filler, the quantity thereof typically will vary from about 45% to 70% by weight of the molding compound.

Molding of Articles

As is the case with novolac molding compounds, the curable molding compounds of this invention are formed and cured under the influence of temperature and pressure. On heating, the curable spray dried phenolic resole resin which is present in the mass as part of the binder softens while the crystalline phenolic compound melts, providing a decreased viscosity and better flow for the overall melt. Thus, the molding compound flows, filling the mold cavity. At the same time the cross-linking reaction between the resole and the crystalline compound begins and eventually the composition is hardened into an infusible thermoset mass. From this moment the material can no longer be melted; the curing (cross-linking) is irreversible. The molded article is typically removed from the mold while still hot. Generally, the molding compound supplied to the molding processor contains all the necessary fillers, stabilizers, lubricants, colorants and flame retarders.

For compression molding by this invention, the molding compound, e.g., in powder or granular form, is poured into the mold cavity or a preform, heated prior to molding. Molding temperatures typically range from about 120E C. to 190E C., preferably about 140E C. to 185E C. and particularly from about 150° C. to 180° C. Conventional molding pressures can be used such as those from about 1,000 to 8,000 psi, preferably from about 1500 to 6000 psi. The in-mold cure time will typically vary from about 45 seconds to 180 seconds, preferably from about 50 to 120 seconds.

In order to customize the properties of the binder of this invention, the total quantity of the binder can be a blend of preformed binders of this invention having different quantities of the spray dry resin in relation to the crystalline compound.

The invention is illustrated by the following examples which are intended merely for the purpose of illustration and are not to be regarded as limiting the scope of the invention or the manner in which it may be practiced. Unless the context clearly indicates otherwise, parts and percentages in this application are given by weight.

EXAMPLE 1

One part by weight of W71 A, of Borden Chemical, Inc. of Columbus, Ohio which is a spray dried phenolic resole resin made by the process set forth in U.S. Pat. No. 4,950,433 of August 1990, U.S. Pat. No. 5,019,618 of May 1991, and U.S. Pat. No. 5,047,275, all to S. Chiu, and one part by weight of powdered bisphenol-A were placed on a hot plate maintained at 157E C. for 46.4 seconds. During that time period, the blend is first liquified to a homogeneous melt and finally cured to a hard thermoset product. The thermoset product was then ground and contacted with acetone in a soxhlet extraction apparatus. Less than 0.1% of the product was extracted by the acetone which indicates a rather complete reaction between the resole and crystalline phenolic.

EXAMPLE 2

A series of tests were performed to compare the effect of changes in the concentration of powdered bisphenol-A in relation to the powdered phenolic resole resin. The conditions of comparison were as follows:

1. A blend of powdered bisphenol-A and W71A powdered spray dried phenolic resole resin at a concentration of 8% by weight in a 50/50 blend, by weight, of hard and soft wood flour as a filler was used as the molding compound. The ratio of bisphenol-A to phenolic resole resin used in the tests is shown in Table 2.
2. Toilet seats were molded from the above blends which were cured at 180E C. for 10 minutes at a compression of 1250 psi via the Wabash Hydraulic Press (Model 30-15-2 MTBAC.
3. Screw pull tests were run via the Tinus Olsen (LOCAP Testing Machine). The results are shown in the following Table 2.

It can be seen from the below Table 2 that the use of the blend of powdered bisphenol-A together with the spray dried phenolic resole resin significantly increased the amount of force needed to pull the screws out of the molding as compared to the spray dried resin alone. Tests with 100% of bisphenol-A were not performed since bisphenol-A does not itself produce a thermoset product. Similar tests were performed using a binder of bisphenol-A and the W71 A under otherwise the same conditions and compositions as shown in this example and Table 2 below but the total quantity of bisphenol-A in the binder contained less than about 15% of bisphenol-A. It was found that such small amounts of bisphenol were insufficient to provide a force to pull out the screw that was greater than that of the W71A alone.

TABLE 2

| Sample | Pounds of Force Required to Pull Out the Screw From the Molding (Each Entry Represents the Average of 15 Tests) |
|---|---|
| 100% of W71A | 273 |
| 2 Parts by Weight of W71A with 3 Parts of Bisphenol-A | 280 |
| 3 Parts by Weight of W71A with 2 Parts of Bisphenol-A | 305 |

Other binders can be produced by simply substituting other crystalline phenolic compounds such as bisphenol-C, bisphenol-E, etc. in place of the bisphenol-A used in Example 2 above and by substituting other spray dried resins such as those of U.S. Pat. Nos. 4,424,300 and 4,098,770 in place of that used in this example.

EXAMPLE 3

A granular molding composition of this invention containing short glass fibers was produced and its melt flow properties and curing kinetics were compared with those of a counterpart based on a typical phenolic novolac/hexamethylenetetramine resin matrix. For the text and tables set forth in this Example 3 the following explanations are provided.

(1) Compound A is a molding powder of this invention which has the following: physical properties of (a) a hot plate cure at 150° C. of 32 seconds and (b) a radial flow at 150° C. of 70 mm (millimeters); and a chemical composition of (a) less than 0.1% of free phenol; (c) 0.1% of nitrogen; (d) 75% of spray dried resole (W-71A powder); and (e) 25% of powdered bisphenol-A.

(2) Compound B is a commercial phenol-formaldehyde molding powder sold by Borden Chemical, Inc. under the designation of Durite SD-104A which contains about 82% of a sulfuric acid catalyzed phenol-formaldehyde novolac resin and about 15% of hexamethylenetetramine.

(3) Spiral Flow tests are described in Example III of U.S. Pat. No. 6,312,639.

(4) "TA" of the thermal mechanical analyzer refers to TA Instruments Company of 109 Lukens Drive, in New Castle, Del., 19720.

THe composition of the molding material is presented in Table 3A below.

TABLE 3A

| Constituent | Percent by Weight |
| --- | --- |
| Compound A or Compound B | 30.0 |
| Chopped Glass Strand | 59.0 |
| Kaolin Clay | 7.0 |
| Hydrated Lime | 1.0 |
| Pigment and Mold Release Agents | 3.0 |
| Total | 100.0 |

Physical blend of the constituents of Table 3A were melt compounded using a 2-roll mill. The compounded materials were cooled to room temperature, and subsequently ground and size classified to obtain minus 4-mesh, free flowing, granular product form. The melt flow properties of the resultant molding compounds are summarized in Table 3B below.

TABLE 3B

| Test | Compound A | Compound B |
| --- | --- | --- |
| Volatile materials (160° C.), % | 3.1 | 2.8 |
| MESA Spiral Flow, inches | 12 | 12 |
| Brabender Plasticorder (110° C.) | | |
| Minimum Torque, m-g | 380 | 500 |
| Processing Time*, minutes | 6.3 | 9.2 |

*time to gelation

The development of glass transition temperatures (Tg) under typical molding conditions was also compared. Test bars were compression molded with various cure times and a nominal mold temperature of 171° C. (340° F.). Linear thermal expansion measurements were then made with a TA Instruments thermal mechanical analyzer. The midpoints of the Tg region were inferred from the inflection in the thermal expansion curves. The data presented in the following table, demonstrate the greatly increased rate to Tg development obtained with the resin chemistry of this invention. Glass-transition temperature elements (° C.) are set forth below in Table 3C.

TABLE 3C

| In-Mold Cure Time, Seconds | Compound A | Compound B |
| --- | --- | --- |
| 60 | 256 | 158 |
| 90 | 255 | 173 |
| 120 | 261 | 191 |
| 180 | 258 | 196 |

The higher Tg values in the above Example 3 indicate a more complete cure of the molding compound.

It was determined in comparative tests between Compound A and Compound B that Compound B blistered with molding times under 30 seconds whereas Compound A did not blister with a molding time of 24 seconds. Compound A showed a lower minimum viscosity but a faster cure time in comparison to Compound B.

Following the procedure of the above Example 3, a 50/50 blend of bisphenol-A and W71 A was used instead of the 25/75 blend of bisphenol-A to spray dried resin and some blistering was encountered at press cycles below 60 seconds.

EXAMPLE 4

This example shows the effect of changes in the flow properties of a spray dried resole resin with varying amounts of the crystalline phenolic compound. The use of the spray dried resole resin alone will give flows which are less than those of the blends shown below. In the below Table 4: the spray dried resole is W71A whereas the crystalline phenolic compound is bisphenol-A; Blend A is a 50-50 blend of the spray dried resole resin and bisphenol-A; Blend B is a blend of 75 parts of the spray dried resole resin and 25 parts of bisphenol-A; and Blend C is a blend of 85 parts of the spray dried resole resin and 15 parts of bisphenol A. The flow was determined by the Radial Flow Test which is described hereinbelow It can be seen from Table 4 that the larger quantities of the crystalline phenolic compound provide for increased flows.

| Binder | Radial Flow, in mm (millimeters) |
| --- | --- |
| Binder A | 45 |
| Binder B | 35 |
| Binder C | 32.5 |

Radial Flow Test

The powdered material to be tested, in pelletized disk form, is subjected to heat and pressure for a time interval. The disk softens and due to applied pressure flows outwardly from the center of the disk in all directions. The radius, in mm, of the flattened disk, when the test is completed, is reported as Radial Flow. Radial Flow is a good indicator of the cure and flow characteristics of the material.

The apparatus used for conducting this test are as follows. (1) A Parr pellet press #2811 (½ inch die set). (2) Thermo-electric cure plate—thermostat controlled. (3) 1,000 Ml (milliliter) cylinder. (4) Lead shot. (5) Glass plates, ⅛ inches thick, 4 to 5 inches square. (6) Aluminum foil. (7) MM (millimeter) ruler.

No reagents are required.

The procedure is as follows. (1) Fill the 1,000 ml cylinder with lead shot until the total weight of the cylinder and shot is 6,000 g (grams) (approximately 800 ml). (2) heat the cure plate and regulate temperature to 150° C.±1° C. (3) Cut pieces of aluminum foil to approximately the same size as the glass plate (4 to 5 inches square) while taking care to avoid wrinkling the foil excessively. (4) To test the powdered sample, prepare a pellet by compressing ½ g of the material in the Parr pellet press. Avoid handling the pellet as moisture from the skin is readily absorbed by the pellet. (5) Make a sandwich of a piece of aluminum foil, the pellet and a glass plate. The pellet should be centered as closely as possible, with the glass plate on top. (6) Transfer the foil, pellet, and glass plate to the surface of the preheated cure plate, with the glass plate on top and the foil at the bottom. (7) Quickly place the cylinder containing lead shot on top of the glass plate. It will be necessary to balance the plate by hand until the pellet begins to flow. The cylinder should remain in place, pressing downward on the glass plate, for 3 minutes. (8) At the end of 3 minutes, remove the cylinder from the glass plate and carefully remove the sandwich from the cure plate. (CAUTION-HOT!!) Peel the aluminum foil from the flattened pellet.

Calculation. (1) Using the millimeter ruler, determine the average diameter of the flattened pellet. Divide this figure by 2 to obtain the radius of the flattened pellet. Report this value as the Radial Flow of the powdered material. (2) A visual record of the test can be made by making a Xerox copy of the flattened pellet.

What is claimed is:

1. A binder composition comprising a mixture of a thermosetting spray dried phenolic resole resin and a crystalline phenolic compound having two or more hydroxyphenyl groups wherein the quantity of resole resin is from about 45% to 90% and the quantity of crystalline phenolic compound is 10% to 55%, by weight, of the binder.

2. The binder of claim 1 in the form of a blended powder.

3. The binder of claim 2 wherein the phenolic ingredient of the resole is phenol itself.

4. The binder of claim 2 wherein the resole resin is prepared with formaldehyde.

5. The binder of claim 2 wherein the resole resin is prepared with a molar ratio ot 2 to 3 moles of formaldehyde for each mole of phenol.

6. The binder of claim 2 wherein the crystalline phenolic compound is bisphenol-A.

7. The binder of claim 2 wherein the crystalline phenolic compound is a member selected from the group consisting of bisphenol-A, bisphenol-AD, bisphenol-C, bisphenol-B, bisphenol-F, bisphenol-S, bisphenol Z, and mixtures thereof.

8. The binder composition of claim 2 wherein tba crystalline compound is bisphenol-A, the quantity of resole resin in from about 60% to 80% and the quantity of the crystalline phenolic compound is 20% to 40% and wherein the resole is prepared from phenol itself and formaldehyde in a molar ratio of about 2 to 3 moles of formaldehyde for each mole of phenol.

9. A thermoset product prepared by heating a blend comprising a thermosetting spray dried phenolic resole resin and a crystalline phenolic compound having two or more hydroxyphenyl soups wherein the quantity of resin is from about 45% to 90% and the quantity of crystalline phenolic compound is from about 10% to 55%, by weight based on the weight of said resin and crystalline phenolic compound.

10. The product of claim 9 wherein the crystalline phenolic compound is bisphenol-A.

11. The product of claim 9 wherein the blend comprises 55% to 85% of resole resin and 15% to 45% of crystalline phenolic compound.

12. The product of claim 9 wherein the blend comprises 60% to 80% of the resole resin and 20% to 40% of the crystalline phenolic compound.

13. A molding compound comprising: (a) a filler, and (b) a blend of a crystalline phenolic compound having two or more hydroxyphenyl groups and a thermosetting spray dried phenoic resole resin wherein the quantity of resole varies from about 45% to 90% and the quantity of crystalline phenolic compound varies from about 55% to 10% based on to total weight of resole and crystalline phenolic compound.

14. The molding compound of claim 13 which is substantially free of hexamethylenetetramine.

15. The molding compound of claim 13 wherein the quantity of the blend varies from about 15% to 60% by weight of the molding compound.

16. A molded article comprising about 10% to 92% by weight of a filler bound under heat and pressure with a blend of thermoset binds said binder comprising by weight, about 45% to 90% of a spray dried phenolic resole resin mid about 10% to 55% of a crystalline phenolic compound having two or more hydroxyphenyl groups.

17. The molded article of claim 16 wherein the crystalline phenolic compound is bisphenol-A.

18. A method for making a molded article which comprises subjecting a mixture of a filler and a blend of thermosetting spray dried phenolic resole resin and a crystalline phenolic compound having two or more hydroxyphenyl groups to heat and pressure in order to cure the blend wherein to blend comprises from about 45% to 90%, by weight of the resole and 10% to 55%, by weight, of the crystalline phenolic compound.

19. The method of claim 18 wherein the crystalline phenalic compound is bisphenol-A and the quantity of blend varies from about 8% to 90% by weight of the filler and blend.

20. The method of claim 18 wherein the molding temperature is from about 150° C. to about 180° C.

21. The method of claim 20 wherein the quantity of resole resin is from about 60% to 80%, the quantity of crystalline phenolic compound is from 20% to 80% and the in-mold cure time varies from about 45 to 180 seconds.

22. A method for increasing the length of flow of a thermosetting spray-dried resole resin which comprises blending said resin with a crystalline phenolic compound having two or more hydroxyphenyl groups wherein the quantity, by weight, of resole resin to crystalline phenolic compound varies from about 45% to 90% for the resole resin mad the quantity of crystalline compound varies from about 10% to 55%.

23. The method of claim 22 wherein the quantity of resole resin varies from about 60% to 80% and the quantity of crystalline compound varies from about 20% to 40%, by weight.

* * * * *